(12) United States Patent
Sheriff et al.

(10) Patent No.: US 12,524,329 B2
(45) Date of Patent: Jan. 13, 2026

(54) WEB APPLICATION OBSERVABILITY WITH DISTRIBUTED TRACKING AND CUSTOM HEADER

(71) Applicant: Cisco Technology, Inc., San Jose, CA (US)

(72) Inventors: Akram Ismail Sheriff, San Jose, CA (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 228 days.

(21) Appl. No.: 18/344,079

(22) Filed: Jun. 29, 2023

(65) Prior Publication Data

US 2025/0004914 A1 Jan. 2, 2025

(51) Int. Cl.
*G06F 11/362* (2025.01)
*H04L 67/025* (2022.01)

(52) U.S. Cl.
CPC ........ *G06F 11/3636* (2013.01); *H04L 67/025* (2013.01)

(58) Field of Classification Search
CPC ............................ G06F 11/3636; H04L 67/025
See application file for complete search history.

(56) References Cited

U.S. PATENT DOCUMENTS

| | | | |
|---|---|---|---|
| 10,929,211 B1 | 2/2021 | Mylavarapu et al. | |
| 10,986,192 B2* | 4/2021 | Gao | H04L 67/75 |
| 11,204,818 B1* | 12/2021 | Kunz | G06F 9/542 |
| 2003/0061600 A1* | 3/2003 | Bates | G06F 11/3698 717/109 |
| 2018/0046526 A1 | 2/2018 | Malkiman et al. | |
| 2021/0168116 A1* | 6/2021 | Shulman | H04L 9/0643 |
| 2022/0038368 A1 | 2/2022 | Shen et al. | |
| 2022/0060398 A1* | 2/2022 | Shishir | H04L 63/1408 |
| 2022/0070279 A1 | 3/2022 | Pang et al. | |

(Continued)

OTHER PUBLICATIONS

IBM, "Instana Version current (251)," https://www.IBM.com/docs/en/instana-observability/251?topic=openshift-build-251m, Jun. 2023, 1533 pages.

(Continued)

*Primary Examiner* — Wei Y Mui
*Assistant Examiner* — Travis Viet Tran
(74) *Attorney, Agent, or Firm* — Edell, Shapiro & Finnan, LLC

(57) ABSTRACT

A method is provided that includes injecting a trace agent within a side-car container on a first microservice that runs in a point-of-delivery (POD) on a compute device; when an API request is made from the first microservice to a second microservice the trace agent adds traceability metadata in a header within application data of the API request and within an application-layer protocol header of the API request. A mapping table is generated or updated, the mapping table including entries for identification information associated with the API request. When an API reply is received at the first microservice from the second microservice, the identification information in the mapping table is updated. The mapping table may be exported to a collector device that is configured to reconcile API communications between the first microservice and the second microservice using contents of the mapping table.

22 Claims, 10 Drawing Sheets

(56) References Cited

U.S. PATENT DOCUMENTS

| | | | |
|---|---|---|---|
| 2022/0272009 A1 | 8/2022 | Takvorian | |
| 2022/0308869 A1 | 9/2022 | Jain et al. | |
| 2023/0101447 A1* | 3/2023 | Bispo | G06F 9/547 |
| | | | 719/311 |
| 2023/0195597 A1* | 6/2023 | Guzman | G06F 11/3656 |
| | | | 717/124 |
| 2023/0208855 A1* | 6/2023 | Sheriff | H04L 41/0631 |
| | | | 726/22 |
| 2024/0220342 A1* | 7/2024 | Gupta | G06F 3/04842 |

OTHER PUBLICATIONS

Hadfield, A., "Distributed Tracing: An Ultimate Guide," https://www.ibm.com/topics/distributed-tracing, Jan. 17, 2023, 5 pages.

Gud, A., "Leveraging OpenTelemetry for Custom Context Propagation," https://doordash.engineering/2021/06/17/leveraging-opentelemetry-for-custom-context-propagation/, Jun. 17, 2021, 13 pages.

Opentelemetry, "Traces," https://opentelemetry.io/docs/concepts/signals/traces/#context-propagation, Jun. 12, 2023, 8 pages.

Dynatrace Docs, "Distributed tracing by PurePath® technology," retrieved from https://www.dynatrace.com/support/help/observe-and-explore/purepath-distributed-traces, on Jun. 5, 2023, 4 pages.

Dynatrace, Dynatrace Community, Dynatrace, Learn, Dynatrace tips, "W3C tracestate and X-Dynatrace," retrieved from https://community.dynatrace.com/t5/Dynatrace-tips/W3C-tracestate-and-X-Dynatrace/td-p/119243, on Jun. 5, 2023, 6 pages.

Dynatrace Docs, "Trace AWS Lambda .NET Core functions with OpenTelemetry .NET," retrieved from https://www.dynatrace.com/support/help/setup-and-configuration/setup-on-cloud-platforms/amazon-web-services/amazon-web-services-integrations/aws-lambda-integration/aws-lambda-otel-integration/lambda-otel-native, on Jun. 5, 2023, 7 pages.

Dynatrace, Dynatrace Community, "Using custom header instead of x-dynatrace," https://community.dynatrace.com/t5/0pen-Q-A/Using-custom-header-instead-of-x-dynatrace/m-p/121278, Dec. 14, 2021, 4 pages.

Dynatrace, Dynatrace Community, "One Agent and OpenTelemetry: how do they handle tracing headers in Java applications?," https://community.dynatrace.com/tS/Open-Q-A/One-Agent-and-OpenTelemetry-how-do-they-handle-tracing-headers/m-p/187193, May 26, 2022, 8 pages.

DGS Framework, Instrumentation (Tracing, Metrics), "Adding instrumentation for tracing and logging," retrieved from https://netflix.github.io/dgs/advanced/instrumentation/, on Jun. 5, 2023, 13 pages.

Parker, A, et al., O'Reilly, "Chapter 1. The Problem with Distributed Tracing," retrieved from https://www.oreilly.com/library/view/distributed-tracing-in/9781492056621/ch01.html, Jun. 5, 2023, 10 pages.

Amazon API Gateway, "Developer Guide," retrieved from https://docs.aws.amazon.com/apigateway/latest/developerguide/welcome.html, Jun. 5, 2023, 850 pages.

Software AG, Tech Community, "Host Header being dropped in API Gateway Straight Through Routing," API Gateway 10.11, https://tech.forums.softwareag.com/t/host-header-being-dropped-in-api-gateway-straight-through-routing/255274, Feb. 2022, 3 pages.

* cited by examiner

```
curl 'http://localhost:5681/v1/traces' \
-H 'Content-Type: application/json' \
--data-raw
'{"resourceSpans":[{"resource":{"attributes":[{"key":"service.name","value":{"stringValue":"unknown_service"}},{"key":"telemetry.sdk.language","value":{"stringValue":"webjs"}},{"key":"telemetry.sdk.name","value":{"stringValue":"opentelemetry"}},{"key":"telemetry.sdk.version","value":{"stringValue":"0.23.0"}}]},"droppedAttributesCount":0},"instrumentationLibrarySpans":[{"spans":[{"traceId":"5661215315a87ad7dd8448b4101a59a9","metdataid":"146292","spanId":"29f50492db6b0ced","name":"files-series-info-0","kind":1,"startTimeUnixNano":1625600080021140020,"endTimeUnixNano":16256008007004000000,"attributes":[],"droppedAttributesCount":0,"events":[{"timeUnixNano":16256008007004000000,"name":"fetching-span1-completed","attributes":[],"droppedAttributesCount":0}],"droppedEventsCount":0,"status":{"code":0},"links":[],"droppedLinksCount":0}],"instrumentationLibrary":{"name":"example-tracer-web"}}]}]}'
```

FIG.3

| | AppID | Source POD | Destination POD | Source uServiceID | Destination uServiceID | traceID, SpanID.. |
|---|---|---|---|---|---|---|
| 710 API CALL 1 Tx VIEW | A | POD 11 | POD 22 | A1 | Nil | XYZ111, ABC321 |
| 712 API CALL 1 Rx VIEW | A | POD 11 | POD 22 | A1 | A2 | XYZ111, ABC456 |
| 714 API CALL 2 Tx VIEW | A | POD 22 | POD 11 | A2 | nil | XYZ222, DEF321 |
| 716 API CALL 2 Rx VIEW | A | POD 22 | POD 11 | A2 | A1 | XYZ222, DEF456 |

FIG.7

| | AppID | Source POD | Destination POD | Source uServiceID | Destination uServiceID | traceID, SpanID.. |
|---|---|---|---|---|---|---|
| 810 API CALL 1 Tx VIEW | A | POD 11 | POD 22* | A1 | Nil | XYZ111, ABC321 |
| 812 API CALL 1 Rx VIEW | A | POD 11 | POD 22* | A1 | A2* | <lost> |
| 814 API CALL 2 Tx VIEW | A | POD 22 | POD 11* | A2 | nil | XYZ222, DEF321 |
| 816 API CALL 2 Rx VIEW | A | POD 22 | POD 11* | A2 | A1* | <lost> |

WEB APPLICATION OBSERVABILITY WITH DISTRIBUTED TRACKING AND CUSTOM HEADER

TECHNICAL FIELD

The present disclosure relates to call flow communications for cloud applications.

BACKGROUND

Many modern cloud native applications use open telemetry tools for collecting metrics, events, logs and traces about cloud applications. This data provides visibility into operational status of cloud applications. There are some legacy or other cloud native applications that do not use open telemetry tools for collecting such data, due to architectural limitations, security processes, etc.

BRIEF DESCRIPTION OF THE DRAWINGS

FIG. 3 is a diagram illustrating an example of a double encapsulated payload created for an API call, according to an example embodiment.

FIGS. 7 and 8 are diagrams depicting examples of mapping tables that are populated by trace agents at microservices during API communications between the microservices, according to an example embodiment.

DESCRIPTION OF EXAMPLE EMBODIMENTS

Overview

Figure 1:
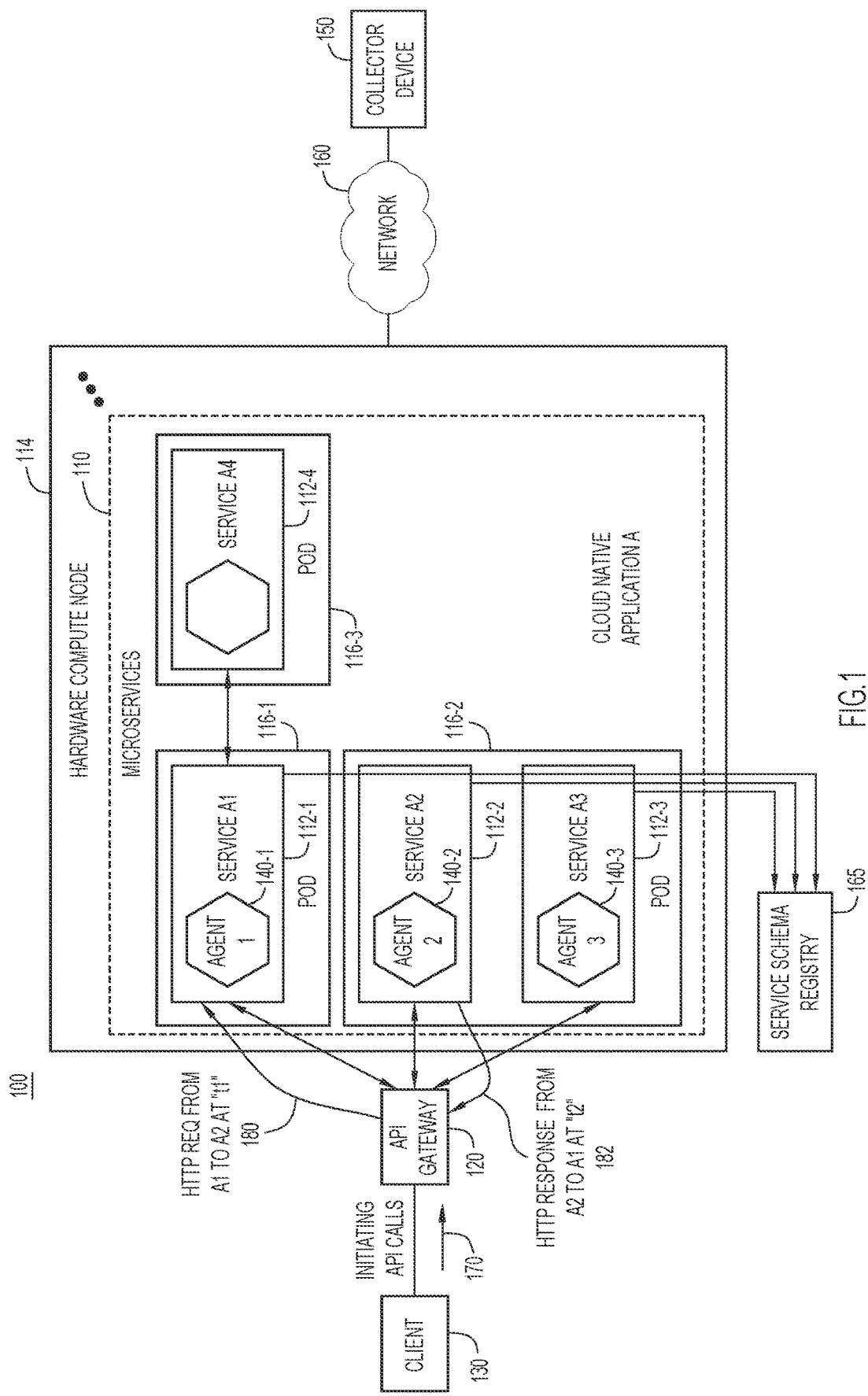
FIG. 1 is a block diagram of a network environment including a system that comprises a cloud native application that includes a plurality of microservices, and a trace agent injected at a microservice to enable end-to-end Application Programming Interface (API) call flow visibility, in accordance with an example embodiment.

Presented herein are techniques to create end-to-end traceability and visibility for application programming interface (API) cloud application communications. A method is provided that includes injecting a trace agent within a side-car container on a first microservice that runs in a point-of-delivery (POD) on a compute device. When an API request is made from the first microservice to a second microservice the trace agent adds traceability metadata in a header within application data of the API request and within an application-layer protocol header of the API request. A mapping table is generated or updated, the mapping table including entries for identification information associated with the API request. When an API reply is received at the first microservice from the second microservice, the identification information in the mapping table is updated. The mapping table may be exported to a collector device that is configured to reconcile API communications between the first microservice and the second microservice using contents of the mapping table.

Example Embodiments

There are some known limitations in implementing distributed tracing, as used by enterprises. Currently, application management vendors and open source tools have used their vendor proprietary Hypertext Transfer Protocol (HTTP) headers (in the data plane) to assist with distributed tracing (management plane). However, such customer header usage in the data plane can cause end-to-end observability (management plane) to break in some scenarios. For example, middleware, such as an Application Programming Interface (API) gateway or reverse proxy, would normally do some kind of inspection of the incoming payload and traffic. The middleware may drop the custom HTTP header attributes based on some security policy. This makes distributed tracing impractical if the custom HTTP headers are not forwarded on in the data plane.

The World Wide Web Consortium (W3C) has made attempts to standardize data formats to avoid using custom headers for contextual data. However, many variations still exist and most deployments continue to use custom headers, thereby not quite addressing the limitation with distributed tracing. This is an important Full Sack Observability (FSO) problem in Hybrid and Multi-cloud architectures.

OpenTelemetry (OTEL) is an open-source observability framework for instrumenting, generating, collecting, and exporting telemetry data such as traces, metrics, and logs. OTEL requires use of trace headers in the data plane. However, OTEL does not define any new format for propagating the contextual data (in the data plane), but rather allows for any W3C compliant formats. An enterprise environment may continue to need data header format translations back and forth, with or without OTEL.

Additionally, most enterprise usage of traceability (any telemetry framework including OTEL) would have strong policy enforcement in the data plane—to drop contextual data from leaking outside the domain (to avoid exposing sensitive information) and also to drop external trace data coming inside the domain (to avoid interfering with the application data). There may also be policies also in the management plane. A domain could be limited to client-side, server-side, partner-side etc. This means that the possibility of certain trace data (whether OTEL is used or not) in the data plane getting dropped is quite reasonable, regardless of what a domain covers and where a policy is executed-API Gateway, Agent, Proxy etc.

Presented herein are techniques to use a trace agent that can construct end-to-end visibility with a call flow graph even when trace data (in a custom HTTP header or not) is used/dropped. Even if there is a packet drop happening at the AP gateway layer for custom HTTP attributes, or HTTPS attributes, these techniques allow backend services, which are sitting behind the API gateway, to stitch the traffic together and create a distributed tracing call flow graph for different API requests hitting the API gateway.

Reference is now made to FIG. 1. FIG. 1 is a block diagram of a network environment including a system 100 that comprises a cloud native application A at reference numeral 110 that includes a plurality of microservices, for example, microservices A1, A2, A3 and A4. The microservices A1, A2, A3 and A4 are identified with reference numerals 112-1, 112-2, 112-3 and 112-4. The cloud native application 110 may be running on a hardware compute node 114, and there may be multiple point-of-delivery (PODs) such that the microservices 112-1, 112-2, 112-3 and 112-4 may be running within different PODs. For example, microservice 112-1 is running in a POD 116-1, microservices 112-2 and 112-3 are running in the same POD, POD 116-2, and microservice 112-4 is running in a POD 116-3. This is only by way of example, and the number of PODs and number of microservices may be different.

As shown in FIG. 1, there may be multiple cloud native applications running on the hardware compute node 114, e.g., cloud native application B, cloud native application C, etc. The hardware compute node 114 has connectivity to an API gateway 120. The API gateway 120 (or proxy, etc.) serves to handle API calls, such as from a client 130, to the various microservices running for a given cloud native application on the hardware compute node 114. These API calls may take a variety of forms, such as Hypertext Transfer Protocol (HTTP/S) requests, POST, GET, etc. The client 130 may be a mobile device or a web application/entity.

A distributed trace agent (such as an OTEL agent or some other agent) is injected within a side-car container on a microservice running in a POD (where there may be multiple containers running microservices) on an ongoing basis, or as/when needed (based on data analysis and heuristics) to minimize compute/memory footprint on the hardware compute node 114. For example, agent 140-1 may be injected into microservice 112-1, agent 140-2 may be injected into microservice 112-2, agent 140-3 may be injected into microservice 112-3. The trace agents may run in a default namespace or custom namespace as a "daemonset" application of the host hardware compute node 114. The trace agents 140-1, 140-2 and 140-3 inject metadata about API transactions among the microservices 112-1, 112-2 and 112-3, and update that metadata as the API transaction progresses. For example, FIG. 1 shows that there is a collector device 150. The trace agents 140-1, 140-2 and 140-3 may export the data that they collect about the API transactions to the collector device 150 via a network 160. The network 160 may include a local area network and/or a wide area network. The trace agents 140-1, 140-2 and 140-3 are different trace agents each of which injects its own set of custom/unique metadata and attributes specific to that microservice. The arrangement depicted in FIG. 1 is useful for Kubernetes (K8S) and lightweight Kubernetes (K3S) for resource-constrained edge deployments (mobility networks). The trace agents 140-1, 140-2 and 140-3 (or collector device 150) can communicate with a service schema registry 165. The service schema registry 165 is a program or service that describes data structures in a given domain, and can serve as a reference for schema definitions. By centralizing schema definitions, services can exchange data reliably. Thus, the agents 140-1, 140-2 and 140-3 can determine a source or a destination POD identifier using Internet Protocol (IP) addresses of the API HTTP/S packets and looking them up in the service schema registry 165.

As shown in FIG. 1, the client 130 initiates API calls to the cloud native application. The API gateway 120 handles the API calls by sending API requests to a microservice and receiving an API response from the microservice. The client 130 initiates an API call 170 that the API gateway 120 intercepts and forwards to the appropriate microservice running for the cloud native application 110. For example, an API request is forwarded to microservice A1. At 180, microservice A1 sends an HTTP Request to microservice A2 at time t1. At 182, microservice A2 sends an HTTP Response to microservice A1 at time t2. These API transactions may continue, depending on the nature of the API call from the client 130.

Figure 2:
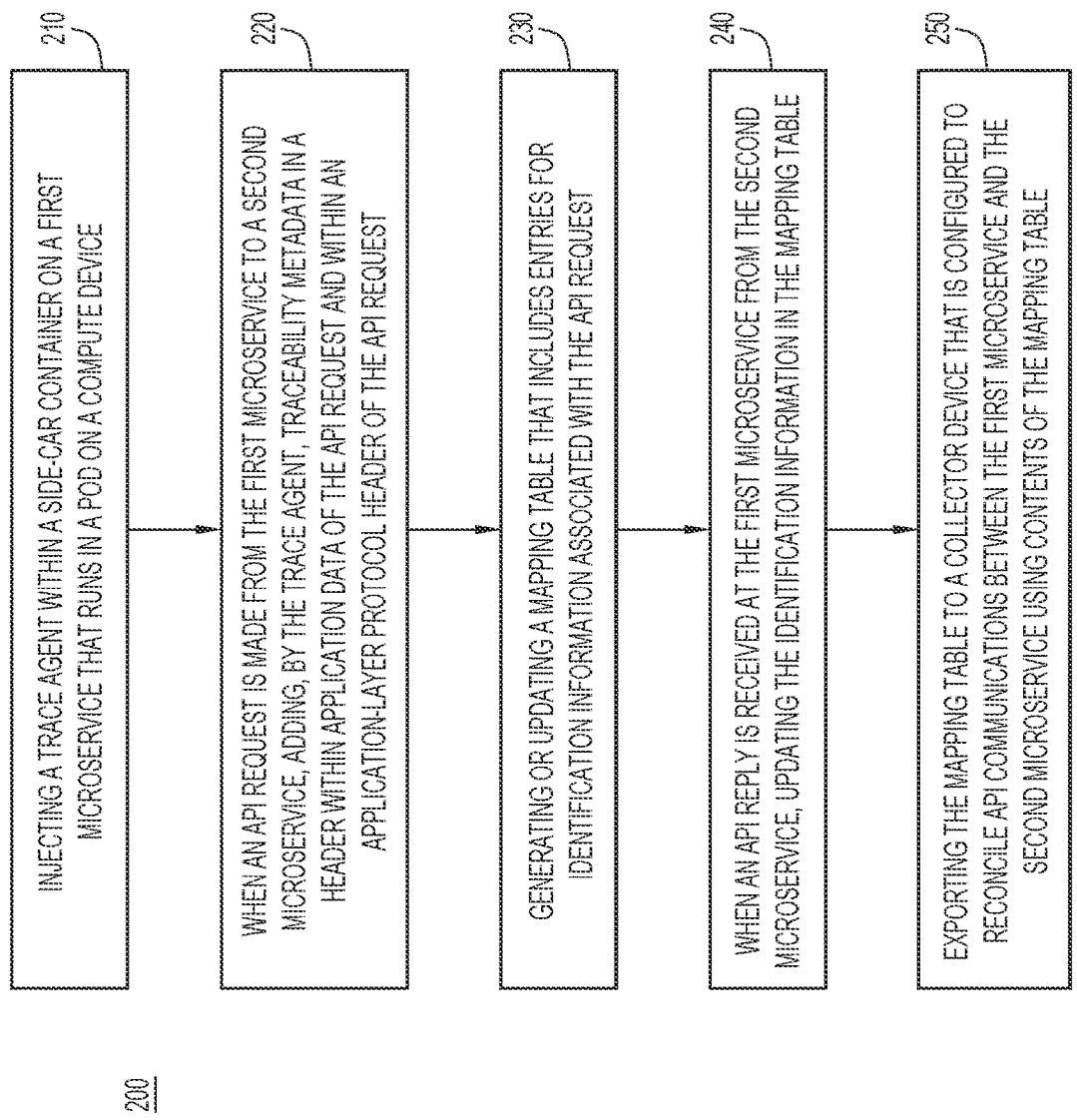
FIG. 2 is a flow chart depicting a method for deploying a trace agent on a microservice to enable end-to-end API call flow visibility, in accordance with an example embodiment.

Reference is now made to FIG. 2, which shows a flow chart for a method 200 according to an example embodiment. Reference is also made to FIG. 1 for the description of FIG. 2. Method 200 creates end-to-end traceability for API cloud application communications. The method 200 includes, at step 210, injecting a trace agent within a side-car container on a first microservice that runs in a POD on a compute device. At step 220, when an API request is made from the first microservice to a second microservice, the method 200 includes adding, by the trace agent, traceability metadata in a header within application data of the API request and within an application-layer protocol header of the API request. At step 230, the method 200 includes generating or updating a mapping table that includes entries for identification information associated with the API request. At step 240, the method 200 includes, when an API reply is received at the first microservice from the second microservice, updating the identification information in the mapping table. At step 250, the method 200 includes exporting the mapping table to a collector device that is configured to reconcile API communications between the first microservice and the second microservice using contents of the mapping table. The steps of method 200 are described in more detail below.

Step 210. As shown in FIG. 1, a trace agent is injected within a side-car container on a microservice, e.g., agent 140-1 on microservice A1. This may occur on demand (when an API call reaches a microservice) to save resources, or the agent may be always be active.

Step 220. When an API request is made from a microservice where the trace agent is injected, the trace agent adds traceability metadata (e.g. trace header) inside the application data of the API request and within an application-layer protocol header (e.g. HTTP custom header, HTTP OTEL trace header) of the API request. So inside the application data, there are added trace metadata and trace attributes, and in the outer header there are also added custom attributes. Thus, there are two levels of encapsulation. The outer level encapsulation consists of application-layer protocol header attributes (e.g., custom HTTP attributes and/or HTTP OTEL attributes), and in the inner level encapsulation, within the application payload, there are metadata and trace header attributes.

FIG. 3 shows an example of this double encapsulated payload 300 that is created for a CURL HTTP request. In the double encapsulated payload 300, the traceability metadata is shown at 310, and the application-layer protocol header (e.g., HTTP) custom attributes are shown at 320.

Step 230. The trace agent creates (if this is the first transaction in a series of API transactions for an API call) or updates (if this is not the first transaction in a series of API transactions for an API call) a mapping table that includes entries for identification information associated with the API request. For example, the mapping table has entries for application identifier (App ID), source Pod ID: microservice ID, destination POD: microservice ID, trace ID, span ID, timestamp, header attributes (outer attributes-HTTP attributes) etc. for that packet. The trace ID is an identifier embedded within the application payload data, as shown in FIG. 3. The timestamp is the time at which the trace agent is injected and related trace metadata. This mapping table is used to enable reconciliation logic at the receiving end or behind the API gateway, or at whatever backend services are running in the cloud native application. Those services would be using this mapping table to do reconciliation of the API transactions.

Step 240. When an API reply is received at the first microservice, the agent at the first microservice updates the identification information in the mapping table. Examples will be described below for steps 230 and 240.

Step 250. The trace agent exports the mapping table information periodically (at a configurable period) to a tracing collector, e.g., collector device 150 shown in FIG. 1. The distributed trace agent may be constantly/continuously exporting this mapping table information. Using this mapping table, it is possible to determine which particular section and which particular table information is actually anomalous, by the backend service(s) behind the API gateway. In other words, the collector device can reconcile the API communications between microservices using contents of the mapping table that is exported to it.

In one example, application A comprises microservices A1, A2 and A3. Microservice A1 (in POD11) sends to microservice A2 (on POD22) an API call requesting some information. The trace agent running on POD11 for microservice A1 creates the following mapping table entries when the API request is sent:

AppID=A; source POD:uServiceID=POD11:A1; Destination POD:uServiceID=<nil>:<nil>; traceID=<XYZ111>, spanID=<ABC321>, . . .

where uServiceID is a microservice identifier and "nil" means null or empty (no data), because at the time the request or reply is sent, the information is not yet known at that microservice.

As time progresses and the API communications continue, the mapping table will be populated automatically, as below.

The trace agent running on POD22 for microservice A2 creates while receiving the API request from microservice A1, the following mapping table entries:

AppID=A; source POD:uServiceID=POD11:A1; Destination POD: uServiceID=POD22:A2; traceID=<XYZ111>, spanID=<ABC456>, . . . .

Note that the span identifier is changing.

Microservice A2 (on POD22) would process the request from microservice A1 and send a reply to microservice A1 (on POD11).

The trace agent running on POD22 for microservice A2 updates the mapping table while sending the reply as follows:

AppID=A; source POD:uServiceID=POD22:A2; Destination POD:uServiceID=<nil>; traceID=<XYZ222>, spanID=<DEF321>, . . . .

Note that the span identifier is changing.

The trace agent running on POD11 for microservice A1 updates the mapping table, while receiving reply from microservice A2:

AppID=A; source uServiceID=A2; Destination uServiceID=A1; traceID=<XYZ222>, spanID=<DEF456>, . . . .

The span identifier is changing.

Figure 4:
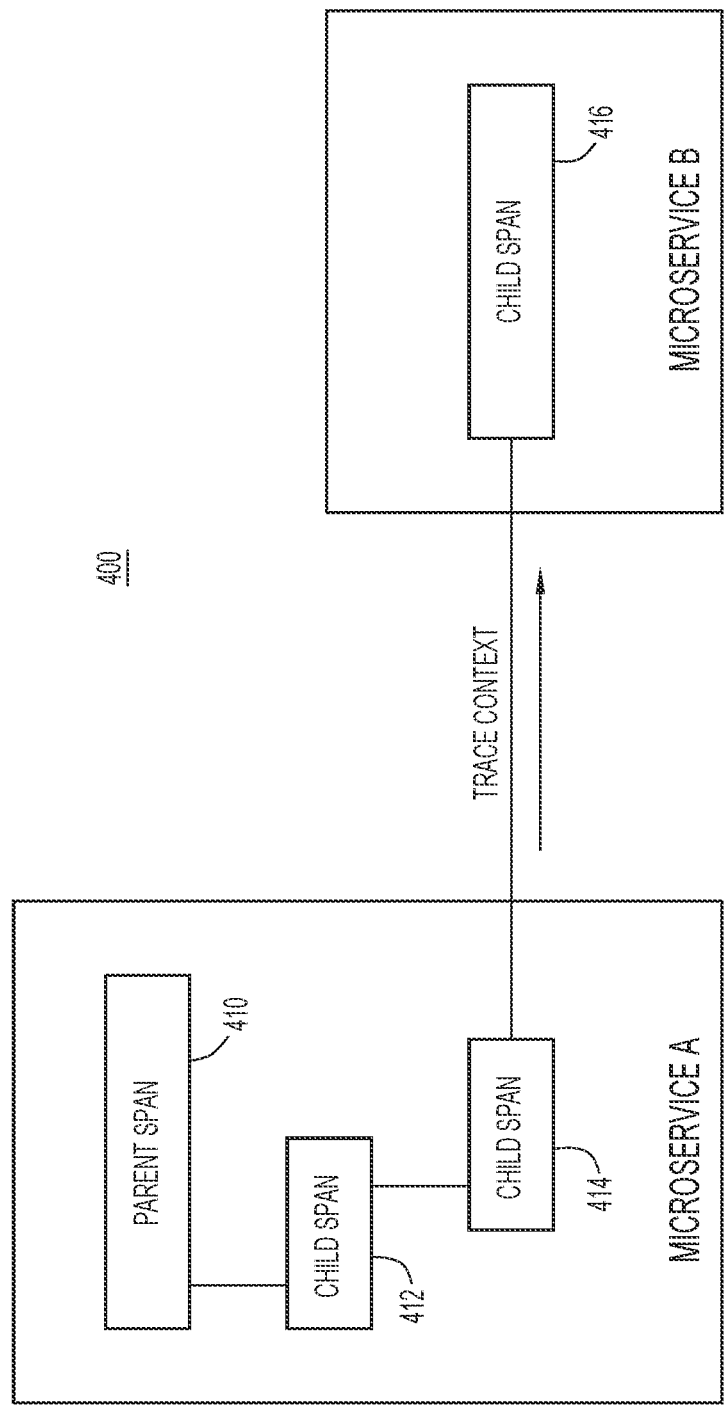
FIG. 4 is a diagram depicting different spans associated with microservices, in accordance with an example embodiment.

FIG. 4 illustrates the concept of spans. There are root or parent spans and child spans. One microservice may instantiate another microservice and that is a "child-child" span. The parent/root span identifier, child span identifier, and the metadata from the microservices at different time periods, are populated into the mapping table. FIG. 4 shows an example of span relationships 400 for two microservices, microservice A and microservice B. Microservice A is a parent or root span 410 and it has a child span 412 and a child span 414. Microservice A instantiates microservice B and thus child span 416 is a child-child span of microservice A, as shown in FIG. 4. The metadata and attributes of root microservice A would be inherited in the metadata and attributes of child span of 416 as shown in FIG. 4. This property is leveraged in building the aforementioned mapping table.

As explained above, step 250 of method 200 may involve creating and visualizing/presenting an API call flow graph based on one or more mapping table entries to reconcile requests and replies of API communications between two or more microservices. The mapping table is self-populated over a period of time over the life of the API communications, and then once the mapping table is in a good steady state, the mapping table is [exchanged] exported to enable another entity, e.g., the collector device, to create a call flow graph from the mapping table.

The mapping table entries are used to reconcile the exchange of communications between two or more microservices. This reconciliation can be done on the tracing collector or on a separate entity connected/communicating with the tracing collector. So even if the API gateway is dropping the metadata, using the mapping table, the backend microservice can reconcile and reconstruct the call flow graph. Once it reconstructs the call flow graph and reconciles the call flow path, it exchanges the data in the granular format to the open telemetry, collector device, or any other device running in the backend services.

An example call flow graph that may be generated from a mapping table may reveal that Application 'A' had a microservice A1 and microservice A2 communicate with each other, such that microservice A1 sent a request to microservice A2 at time t1 (along with other information) and received a reply from microservice A2 at time t2 (+other info). The API gateway dropped custom HTTP header during the A1 to A2 communication at time t12.

Figure 5:
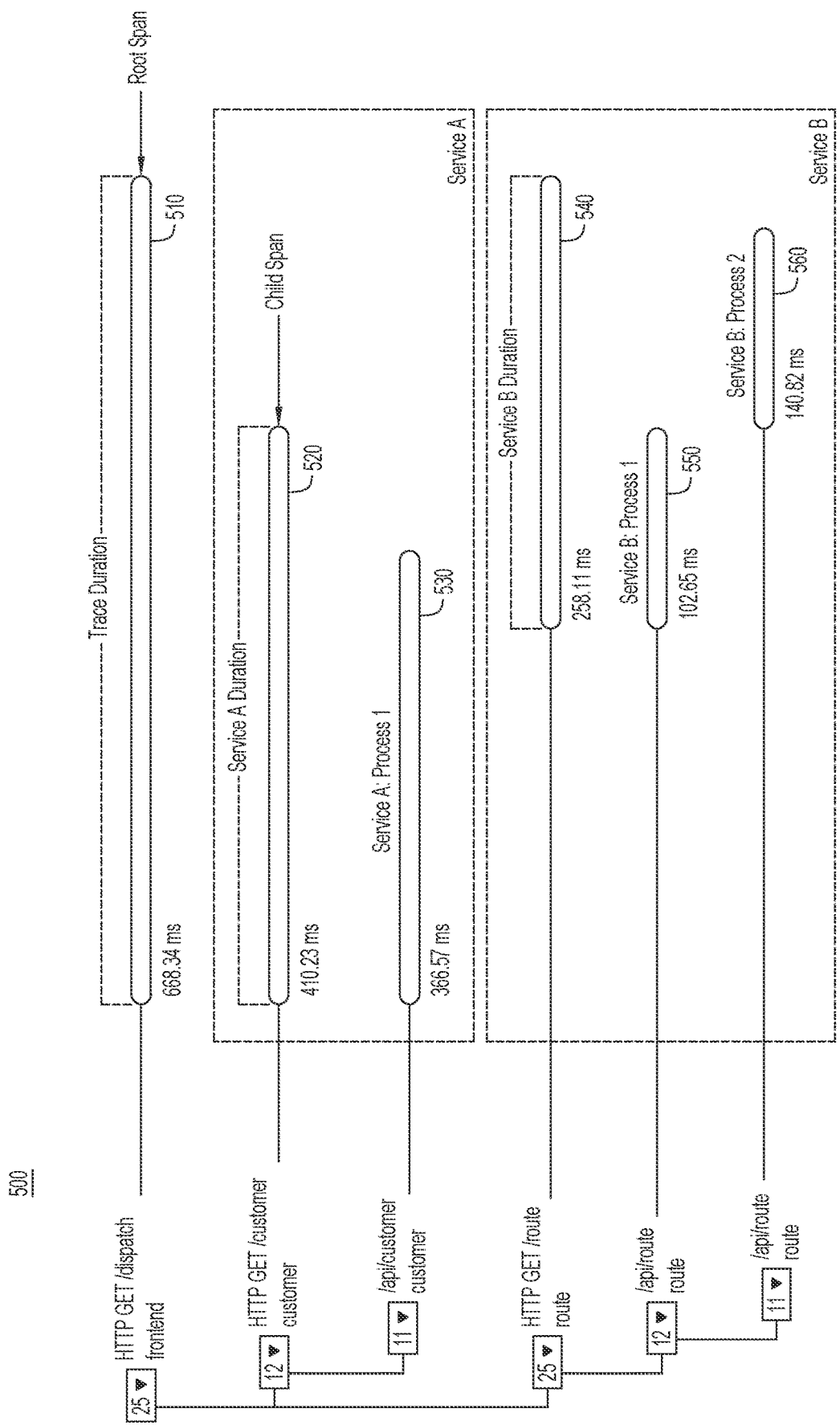
FIG. 5 is an example of a call flow graph that may be created from mapping table information obtained for API communications between microservices, in accordance with an example embodiment.

FIG. 5 illustrates an example of a call flow graph 500 that be generated in order to provide a visual representation of API call communications. In call flow graph 500, there is a cloud application with two microservices involved, microservice A and microservice B. The root span 510 is created with the API call "HTTP GET/dispatch frontend" sent to the cloud application from a client. A child span 520 for microservice A is created when the HTTP GET request reaches microservice A as "HTTP GET:/customer customer", and the child span 520 has a duration. There is also a duration for Process 1 of microservice A, as shown at 530. When HTTP GET:/route route is sent, microservice B goes active as shown at 540. Microservice B has two processes, Process 1 and Process 2, as shown at 550 and 560 in the call flow graph 500.

Figure 6:
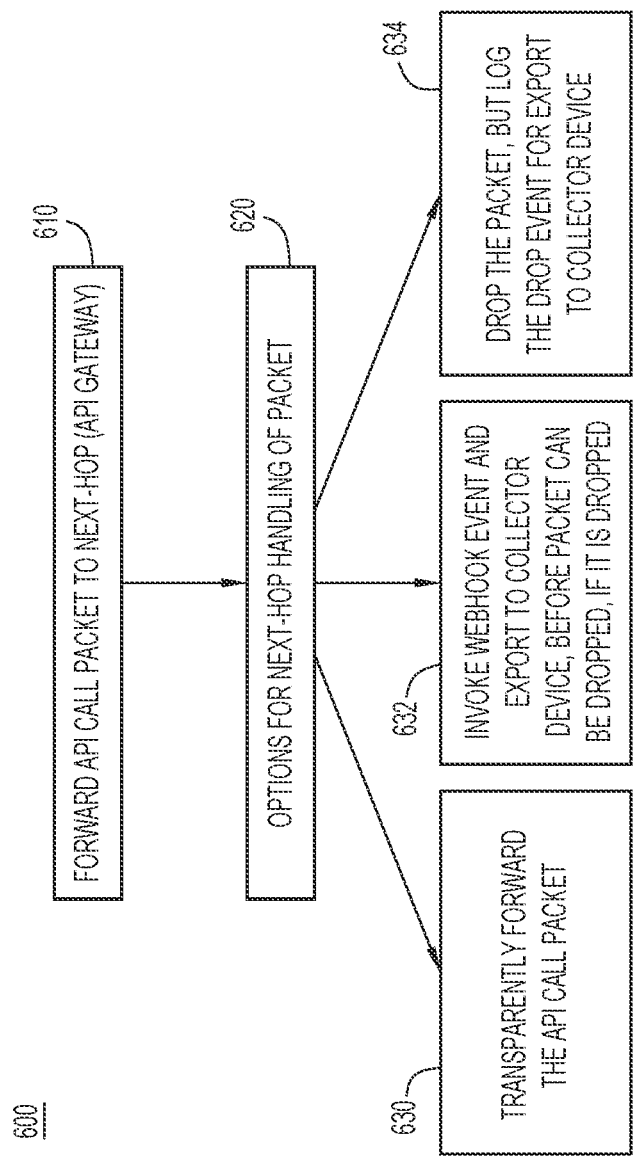
FIG. 6 is a flow diagram depicting operations performed at an API gateway in response to receiving an API call packet, according to an example embodiment.

Turning now to FIG. 6, with continued reference to FIGS. 1 and 2, a further series of steps 600 are now described for a continuation of the method 200. At step 610, as a trace agent populates a packet associated with an API request or reply, the trace agent forwards the modified packet to the next hop, e.g. the API gateway. This happens without waiting on steps 220-240 to complete. Forwarding the modified packet is orthogonal to steps 220-240 since it happens out-of-band in the management plane. The trace agent gets injected as part of the data plane, but the mapping table creation and exchanges between microservices happens in the management plane in the cloud.

As shown at step 620, the next-hop (e.g. API gateway, Proxy etc.) may or may not drop the trace data (in the HTTP custom header or HTTP OTEL trace header) from the received packet. Depending on the role based access controls or security policy running on the API gateway, different execution paths may occur.

At step 630, the next-hop (API gateway) does not drop the HTTP header with respect to trace data, but rather transparently forwards the packet. This is referred to as bypass forwarding or pass-through forwarding. The API gateway receives the packet with the custom HTTP header including the trace data and forwards it on without dropping the packet.

At step 632, the next-hop (API gateway) is made to not drop the HTTP header with trace data by invoking a webhook event upon receiving the packet. The webhook event would let the API gateway ignore the specified HTTP trace header and custom HTTP header attributes. The API gateway logs this event (along with the HTTP header with trace data), which can be exported to the collector device for further processing. The webhook log event will exchange the particular custom header attributes to the backend microservice (collector device), even before the API gateway is able to do deep packet inspection. This may happen in real-time within 10-20 milliseconds before the API gateway can do a deep packet inspection processing. The API gateway will exchange the mapping table to the backend services (collector device) to enable reconciliation on the backend even if the API gateway eventually does drop the packet. Different network device vendors may use different HTTP custom attribute elements and it is desirable to respect that for a given network customer. Thus, invoking the webhook event still gives complete visibility on the receiving side to do reconciliation/reconstruction of the end-to-end call flow graph (API calls).

At step 634, if the next-hop drops the HTTP header with trace data from the packet, then it would log that drop event (along with the trace data) with timestamp information, which can be exported to the collector device for further processing, and thereby allow the collector device to do the reconciliation. This may happen in a majority of cases.

Whether steps 630, 632 or 634 is performed, the event can be reconciled using the information from the custom HTTP header such that it could map to a particular API call flow. The receiving end does the reconciliation in real-time to fill in the "nils" in the mapping table, referred to above, and as described in more detail below. This provides end-to-end visibility of every API request, at the call flow level.

As an example, if there are thousands of requests hitting an API Gateway, out of 1000 requests, 800 requests make it through completely to the backend services (collector device) and 200 microservices have some custom HTTP header attributes, so they are getting dropped at the API gateway layer. Behind the API gateway, the collector device and other backend microservices perform the forward path and reverse path lookup analysis using the aforementioned mapping table and the reconciliation logic to reconstruct the end-to-end API path.

The techniques presented herein are useful to address the distributed tracing problem that is common with application performance monitoring, as the applications get constructed and deployed in a distributed manner (e.g. API to API communication), infused with proprietary header and standards header for API level observability. Furthermore, these techniques may be useful to monitor the network management application performance as its underlying microservices (user experience/user interface related microservices, policy engine related microservices, assurance related microservices, etc.) interact with each other via HTTP based APIs with or without standard header usage. The trace agent (deployed as a sidecar on every POD) would be injecting metadata to every API call made and the data related to the metadata is collected on the receiving end.

This solution assumes that the trace agent (running as a sidecar service) is enabled on the microservice POD, but does not assume that the next-hop (e.g. API Gateway, Proxy) etc. is enabled with the trace agent. If the next-hop (without the resident trace agent) drops the HTTP header with trace data (with custom header or not) in the data plane path, then the next-hop would log that drop event (along with the trace data), which can be exported to the collector for further processing. The receiving POD would receive the data plane API packet either without any metadata or with some metadata (that did not get dropped).

The trace agent on the receiving POD would create/update the mapping table entries, with partial or no metadata. The trace agent (or collector) can deduce the source or destination POD identifier using the IP addresses of the API HTTP/S packet and looking them up in service registry.

Reference is now made to FIGS. 7 and 8 for a description of another example of mapping table generation and updating. In this example, a cloud application A has at least two microservices A1 (running in POD11) and A2 (running in POD22). The mapping table is shown at 700 and each entry in the mapping table includes fields for AppID, Source POD, Destination POD, Destination uService ID, traceID and spanID. A first entry 710 is generated by the trace agent running on microservice A1 when microservice A1 sends an API call to microservice A2, where the API call is one that is requesting information from microservice A2. Worthy to note is that the Destination uServiceID is initially indicated as "Nil" as at the time the entry 710 is created, the trace agent may not be aware of the destination microservice. The traceID is "XYX111" and the spanID is "ABC321".

Entry 712 is created and updated into the mapping table 700 when the API call from microservice A1 is received at microservice A2, and the Destination uServiceID filed is filled in with "A2". The traceID is still "XYX111" but the spanID is different, and is now "ABC456".

Entry 714 is added to the mapping table 700 when an API call is sent from microservice A2 to microservice A1 with data responding to the API request sent by microservice A1. Again, at the time this API call is made, the trace agent running on microservice A2 is not aware of the destination microservice of the API call and thus the Destination uServiceID field is "Nil". The traceID is now "XYZ222" and the spanID is "DEF321". When microservice A1 receives the API call from microservice A2, an entry 716 is created in the mapping table 700 by the trace agent running on microservice A1. The trace agent running on microservice A1 fills in the Destination uService field with "A1".

With reference to FIG. 8, microservice A1 sends another API call to microservice A2, and the trace agent running on microservice A1 updates a mapping table 800 with entry 810. The asterisk for POD22 in the Destination POD field for entry 810 indicates that the API call would be dropped by the API gateway because it has custom HTTP header data along with injected trace data. The traceID is "XYZ111" and the spanID is "ABC321". When microservice A2 receives the API call from microservice A1, the trace agent adds entry 812 into the table 800. Again, there is an asterisk in the Destination POD field and in the Destination uServiceID field to indicate that API call would have been dropped by the API gateway, and the traceID and spanID information for entry 812 is lost, indicating that metadata associated with the API call was dropped by the API gateway. Microservice A2 sends an API call back to microservice A1, and the trace agent for microservice A1 adds entry 814 to mapping table 800. Again, the entry 814 has an asterisk in the Destination POD field and the Destination uServiceID field is "Nil". The traceID is "XYZ222" and the spanID is "DEF321". When microservice A2 receives the API call from microservice A1, the trace agent running on microservice A1 adds entry 816 to the mapping table 800, and the traceID and spanID fields are filled in with "lost" indicating that the metadata associated with API call was dropped by the API gateway. Thus, as indicated by FIGS. 7 and 8, in the event the API gateway drops the entirety of metadata, the trace agent (or collector) can deduce the POD identifier and uServiceID by looking up in the service registry shown in FIG. 1. Thus, the collector device may reconcile the information to create the end-to-end API call flow with this observability data. Reconciliation of the specific link based on the mapping table is a feature not heretofore known.

Figure 9:
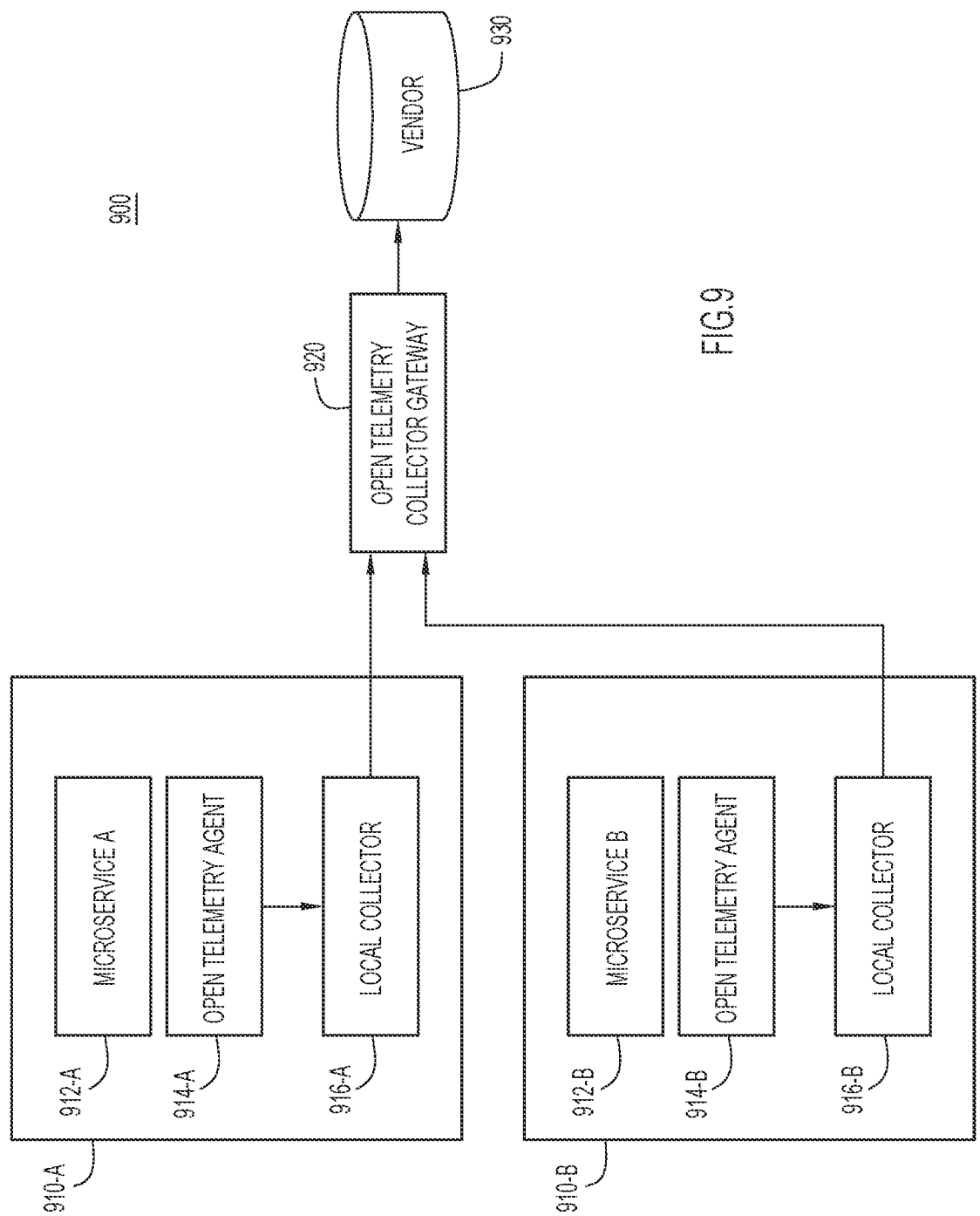
FIG. 9 is a diagram depicting the use of local collector devices associated with each microservice and a collector gateway that may facilitate the collection of API call flow information from trace agents, according to an example embodiment.

Turning now to FIG. 9, there is shown a block diagram of an arrangement 900 that expands on the concepts described thus far. The arrangement 900 includes spans generated by each microservice. For example, there is a span 910-A for microservice 912-A. An OpenTelemetry Agent 914-A is running as a sidecar on microservice 912-A. OpenTelemetry Agent 914-A sends mapping table information associated with API calls to a local collector 916-A. Similarly, there is a span 910-B for microservice 912-B. An OpenTelemetry Agent 914-B is running as a sidecar on microservice 912-B. OpenTelemetry Agent 914-B sends mapping table information associated with API calls to a local collector 916-B.

The local collectors 916-A and 916-B export the mapping table information to an OpenTelemetry collector gateway 920. The OpenTelemetry collector gateway 920 collects the exported mapping table information, processes it (so as to generate a call flow graph and perform reconciliation) and stores processed API call flow information. A database 930 may be provided to store the processed API call flow information from the collector gateway 920.

Figure 10:
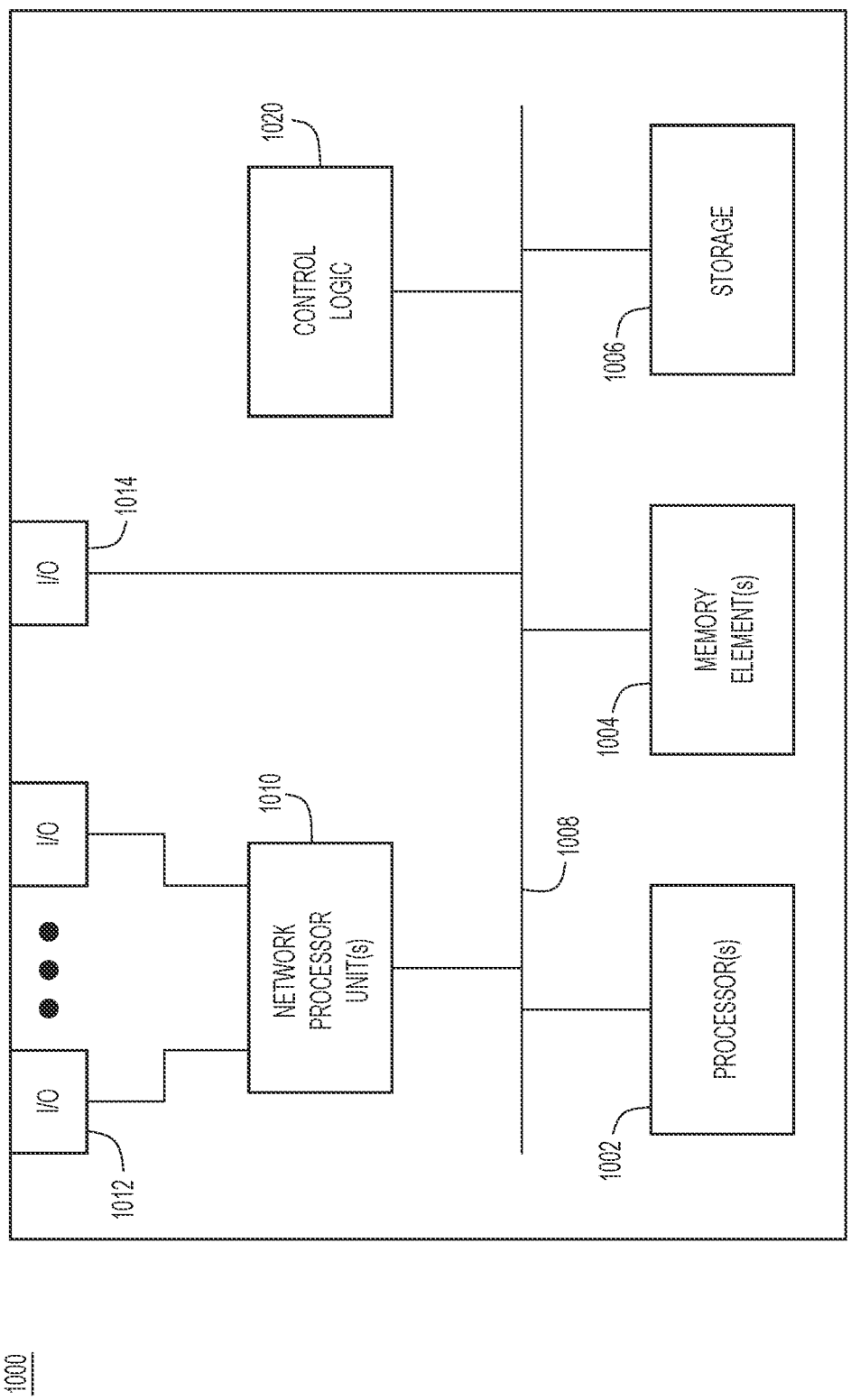
FIG. 10 is a block diagram of a device that may be configured to perform various techniques presented, according to an example embodiment.

FIG. 10 above illustrates a hardware block diagram of a device 1000 (e.g., a network or computing device) that may perform functions associated with operations discussed herein in connection with the techniques depicted in FIGS. 1-9.

In at least one embodiment, the device 1000 may be any apparatus that may include one or more processor(s) 1002, one or more memory element(s) 1004, storage 1006, a bus 1008, one or more network processor unit(s) 1010 interconnected with one or more network input/output (I/O) interface(s) 1012, one or more I/O interface(s) 1014, and control logic 1020. In various embodiments, instructions associated with logic for device 1000 can overlap in any manner and are not limited to the specific allocation of instructions and/or operations described herein.

In at least one embodiment, processor(s) 1002 is/are at least one hardware processor configured to execute various tasks, operations and/or functions for device 1000 as described herein according to software and/or instructions configured for device 1000. Processor(s) 1002 (e.g., a hardware processor) can execute any type of instructions associated with data to achieve the operations detailed herein. In one example, processor(s) 1002 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1004 and/or storage 1006 is/are configured to store data, information, software, and/or instructions associated with device 1000, and/or logic configured for memory element(s) 1004 and/or storage 1006. For example, any logic described herein (e.g., control logic 1020) can, in various embodiments, be stored for device 1000 using any combination of memory element(s) 1004 and/or storage 1006. Note that in some embodiments, storage 1006 can be consolidated with memory element(s) 1004 (or vice versa), or can overlap/exist in any other suitable manner.

In at least one embodiment, bus 1008 can be configured as an interface that enables one or more elements of device 1000 to communicate in order to exchange information and/or data. Bus 1008 can be implemented with any architecture designed for passing control, data and/or information between processors, memory elements/storage, peripheral devices, and/or any other hardware and/or software components that may be configured for device 1000. In at least one embodiment, bus 1008 may be implemented as a fast kernel-hosted interconnect, potentially using shared memory between processes (e.g., logic), which can enable efficient communication paths between the processes.

In various embodiments, network processor unit(s) 1010 may enable communication between device 1000 and other systems, entities, etc., via network I/O interface(s) 1012 (wired and/or wireless) to facilitate operations discussed for various embodiments described herein. In various embodiments, network processor unit(s) 1010 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between device 1000 and other systems, entities, etc. to facilitate operations for various embodiments described herein. In various embodiments, network I/O interface(s) 1012 can be configured as one or more Ethernet port(s), Fibre Channel ports, any other I/O port(s), and/or antenna(s)/antenna array(s) now known or hereafter developed. Thus, the network processor unit(s) 1010 and/or network I/O interface(s) 1012 may include suitable interfaces for receiving, transmitting, and/or otherwise communicating data and/or information in a network environment.

I/O interface(s) 1014 allow for input and output of data and/or information with other entities that may be connected to device 1000. For example, I/O interface(s) 1014 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1020 can include instructions that, when executed, cause processor(s) 1002 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1020) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1004 and/or storage 1006 can store data, software, code, instructions (e.g., processor instructions), logic, parameters, combinations thereof, and/or the like used for operations described herein. This includes memory element(s) 1004 and/or storage 1006 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In summary, techniques and arrangements are provided herein that enable real-time dynamic reconciliation of the API call flow traffic with custom HTTPS header attributes with or without the header attributes getting dropped at API gateway layer. A trace agent is instantiated as/when needed so as to reasonably construct the mapping table entries even when trace data (in custom HTTP header) could be dropped. The mapping table entries are exported to allow a collector device or process reconcile and create the specific API call flow graph with observability data. This solution can be used in full stack observability to allow for observability detection. A network controller could provision an enterprise applet agent dynamically based on enterprise level rules, or a service provider hosted dynamic applet agent, to provide a dynamic restriction policy at the same time provide end-to-end Internet of Things (IoT) observability is achieved.

In some aspects, the techniques described herein relate to a method to create end-to-end traceability for application programming interface (API) cloud application communications, including: injecting a trace agent within a side-car container on a first microservice that runs in a point-of-delivery (POD) on a compute device; when an API request is made from the first microservice to a second microservice, adding, by the trace agent, traceability metadata in a header within application data of the API request and within an application-layer protocol header of the API request; generating or updating a mapping table that includes entries for identification information associated with the API request; when an API reply is received at the first microservice from the second microservice, updating the identification information in the mapping table; and exporting the mapping table to a collector device that is configured to reconcile API communications between the first microservice and the second microservice using contents of the mapping table.

In some aspects, the techniques described herein relate to a method, wherein the mapping table enables the collector device to generate a call flow graph from content of the mapping table, wherein the call flow graph provides a visual representation of content in the mapping table.

In some aspects, the techniques described herein relate to a method, wherein injecting is performed is response to the first microservice sending the API request.

In some aspects, the techniques described herein relate to a method, wherein the mapping table includes for an application identifier, source POD identifier, source microservice identifier, destination POD identifier, destination microservice identifier, trace identifier, and timestamp.

In some aspects, the techniques described herein relate to a method, wherein the trace agent runs as a daemonset application in a custom namespace or a default namespace of the compute device.

In some aspects, the techniques described herein relate to a method, further including: the trace agent at the first microservice forwarding the API request to a next-hop API gateway; and the next-hop API gateway transparently forwarding the API request.

In some aspects, the techniques described herein relate to a method, further including: the trace agent at the first microservice forwarding the API request to a next-hop API gateway; and the next-hop API gateway invoking a webhook event and exporting the traceability metadata to the collector device before the API request can be dropped.

In some aspects, the techniques described herein relate to a method, further including: the trace agent at the first microservice forwarding the API request to a next-hop API gateway; and the next-hop API gateway dropping the API request and logging the traceability metadata for export to the collector device.

In some aspects, the techniques described herein relate to a method, wherein the collector device is a local collector device that is local to the first microservice, and further including: the local collector device forwarding the mapping table to a collector gateway that is communication to local collector devices associated with each of a plurality of microservices.

In some aspects, the techniques described herein relate to one or more non-transitory computer readable storage media encoded with instructions that, when executed by one or more processors, cause the one or more processors to perform operations of a method to create end-to-end traceability for application programming interface (API) cloud application communications including: injecting a trace agent within a side-car container on a first microservice that runs in a point-of-delivery (POD) on a compute device; when an API request is made from the first microservice to a second microservice, adding, by the trace agent, traceability metadata in a header within application data of the API request and within an application-layer protocol header of the API request; generating or updating a mapping table that includes entries for identification information associated with the API request; when an API reply is received at the first microservice from the second microservice, updating the identification information in the mapping table; and exporting the mapping table to a collector device that is configured to reconcile API communications between the first microservice and the second microservice using contents of the mapping table.

In some aspects, the techniques described herein relate to one or more non-transitory computer readable storage media, wherein the mapping table enables the collector device to generate a call flow graph from content of the mapping table, wherein the call flow graph provides a visual representation of content in the mapping table.

In some aspects, the techniques described herein relate to one or more non-transitory computer readable storage media, wherein the mapping table includes for an application identifier, source POD identifier, source microservice identifier, destination POD identifier, destination microservice identifier, trace identifier, and timestamp.

In some aspects, the techniques described herein relate to one or more non-transitory computer readable storage media, wherein the instructions further cause the one or more processors to perform operations including: the trace agent at the first microservice forwarding the API request to a next-hop API gateway; and the next-hop API gateway transparently forwarding the API request.

In some aspects, the techniques described herein relate to one or more non-transitory computer readable storage media, wherein the instructions further cause the one or more processors to perform operations including: the trace agent at the first microservice forwarding the API request to a next-hop API gateway; and the next-hop API gateway invoking a webhook event and exporting the traceability metadata to the collector device before the API request can be dropped.

In some aspects, the techniques described herein relate to one or more non-transitory computer readable storage media, wherein the instructions further cause the one or more processors to perform operations including: the trace agent at the first microservice forwarding the API request to a next-hop API gateway; and the next-hop API gateway dropping the API request and logging the traceability metadata for export to the collector device.

In some aspects, the techniques described herein relate to a system including: a compute device that supports a point-of-delivery (POD) in which a first microservice runs; a collector device that is in communication with the compute device; wherein the compute device that includes one or more processors and memory, wherein the one or more processors are configured to perform operations including: injecting a trace agent within a side-care container of the first microservice; when an application programming interface (API) request is made from the first microservice to a second microservice, adding, by the trace agent, traceability metadata in a header within application data of the API request and within an application-layer protocol header of the API request; generating or updating a mapping table that includes entries for identification information associated with the API request; when an API reply is received at the first microservice from the second microservice, updating the identification information in the mapping table; and exporting the mapping table to the collector device; wherein the collector device is configured to reconcile API communications between the first microservice and the second microservice using contents of the mapping table.

In some aspects, the techniques described herein relate to a system, wherein the collector device is configured to generate a call flow graph from content of the mapping table, wherein the call flow graph provides a visual representation of content in the mapping table.

In some aspects, the techniques described herein relate to a system, wherein the mapping table includes for an application identifier, source POD identifier, source microservice identifier, destination POD identifier, destination microservice identifier, trace identifier, and timestamp.

In some aspects, the techniques described herein relate to a system, further including a next-hop API gateway, wherein the one or more processors of the compute device are configured to cause the trace agent to forward the API request at the first microservice to a next-hop API gateway.

In some aspects, the techniques described herein relate to a system, wherein the next-hop API gateway is configured to transparently forward the API request, invoke a webhook event and export the traceability metadata to the collector device before the API request can be dropped, or drop the API request and log the traceability metadata for export to the collector device.

In some aspects, the techniques described herein relate to an apparatus comprising a network interface, one or more processors, and memory, wherein the one or more processors are configured to perform operations of a method to create end-to-end traceability for application programming interface (API) cloud application communications, the method comprising: injecting a trace agent within a side-car container on a first microservice that runs in a point-of-delivery (POD) on a compute device; when an API request is made from the first microservice to a second microservice, adding, by the trace agent, traceability metadata in a header within application data of the API request and within an application-layer protocol header of the API request; generating or updating a mapping table that includes entries for identification information associated with the API request; when an API reply is received at the first microservice from the second microservice, updating the identification information in the mapping table; and exporting the mapping table to a collector device that is configured to reconcile API communications between the first microservice and the second microservice using contents of the mapping table.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method to create end-to-end traceability for application programming interface (API) cloud application communications, comprising:
    injecting a first trace agent within a side-car container on a first microservice that runs in a point-of-delivery (POD) on a compute device;
    when an API request is made from the first microservice to a second microservice, adding, by the first trace agent, traceability metadata in a header within application data of the API request and within an application-layer protocol header of the API request;
    generating or updating a first mapping table at the first trace agent for API request and API reply exchanges between the first microservice and the second microservice, the first mapping table including one or more entries generated by the first trace agent on the first microservice based on the traceability metadata;
    generating or updating a second mapping table at a second trace agent on the second microservice, the second mapping table having one or more entries generated by a second trace agent on the second microservice based on the traceability metadata; and
    exporting the first mapping table from the first trace agent and the second mapping table from the second trace agent to a collector device that is configured to reconcile API communications between the first microservice and the second microservice using contents of the first mapping table and the second mapping table to reconstruct an end-to-end API call flow between the first microservice and the second microservice.

2. The method of claim 1, wherein the first mapping table and the second mapping table enable the collector device to generate a call flow graph that provides a visual representation of the end-to-end API call flow.

3. The method of claim 1, wherein injecting is performed in response to the first microservice sending the API request.

4. The method of claim 1, wherein the first mapping table and the second mapping table include information for an application identifier, source POD identifier, source microservice identifier, destination POD identifier, destination microservice identifier, trace identifier, and timestamp.

5. The method of claim 4, wherein the traceability metadata further includes information to indicate that a next-hop device or service between the first microservice and the second microservice dropped the application-layer protocol header of a packet that included traceability metadata.

6. The method of claim 5, wherein the traceability metadata enables the collector device to create the end-to-end API call flow even when the next-hop device or service dropped the application-layer protocol header of a packet that included traceability metadata.

7. The method of claim 1, wherein the first trace agent runs as a daemonset application in a custom namespace or a default namespace of the compute device.

8. The method of claim 1, further comprising:
    the first trace agent at the first microservice forwarding the API request to a next-hop API gateway; and
    the next-hop API gateway transparently forwarding the API request.

9. The method of claim 1, further comprising:
    the first trace agent at the first microservice forwarding the API request to a next-hop API gateway; and
    the next-hop API gateway invoking a webhook event and exporting the traceability metadata to the collector device before the API request can be dropped.

10. The method of claim 1, further comprising:
    the first trace agent at the first microservice forwarding the API request to a next-hop API gateway; and
    the next-hop API gateway dropping the API request and logging the traceability metadata for exporting to the collector device.

11. The method of claim 1, wherein the collector device is a local collector device that is local to the first microservice, and further comprising:
    the local collector device forwarding the first mapping table to a collector gateway that communicates to local collector devices associated with each of a plurality of microservices.

12. One or more non-transitory computer readable storage media encoded with instructions that, when executed by one or more processors, cause the one or more processors to perform operations of a method to create end-to-end traceability for application programming interface (API) cloud application communications including:
    injecting a first trace agent within a side-car container on a first microservice that runs in a point-of-delivery (POD) on a compute device;
    when an API request is made from the first microservice to a second microservice, adding, by the first trace agent, traceability metadata in a header within application data of the API request and within an application-layer protocol header of the API request;
    generating or updating a first mapping table at the first trace agent for API request and API reply exchanges between the first microservice and the second microservice, the first mapping table including one or more entries generated by the first trace agent on the first microservice based on the traceability metadata;
    generating or updating a second mapping table at a second trace agent on the second microservice, the second mapping table having one or more entries generated by a second trace agent on the second microservice based on the traceability metadata; and
    exporting the first mapping table from the first trace agent and the second mapping table from the second trace agent to a collector device that is configured to reconcile API communications between the first microservice and the second microservice using contents of the first mapping table and the second mapping table to reconstruct an end-to-end API call flow between the first microservice and the second microservice.

13. The one or more non-transitory computer readable storage media of claim 12, wherein the first mapping table and the second mapping table enable the collector device to generate a call flow graph from the first mapping table and the second mapping table, wherein the call flow graph provides a visual representation of content in the end-to-end API call flow.

14. The one or more non-transitory computer readable storage media of claim 12, wherein the first mapping table and the second mapping table include information for an application identifier, source POD identifier, source microservice identifier, destination POD identifier, destination microservice identifier, trace identifier, and timestamp.

15. The one or more non-transitory computer readable storage media of claim 12, wherein the instructions further cause the one or more processors to perform operations including:
the first trace agent at the first microservice forwarding the API request to a next-hop API gateway; and
the next-hop API gateway transparently forwarding the API request.

16. The one or more non-transitory computer readable storage media of claim 12, wherein the instructions further cause the one or more processors to perform operations including:
the first trace agent at the first microservice forwarding the API request to a next-hop API gateway; and
the next-hop API gateway invoking a webhook event and exporting the traceability metadata to the collector device before the API request can be dropped.

17. The one or more non-transitory computer readable storage media of claim 12, wherein the instructions further cause the one or more processors to perform operations including:
the first trace agent at the first microservice forwarding the API request to a next-hop API gateway; and
the next-hop API gateway dropping the API request and logging the traceability metadata for export to the collector device.

18. A system comprising:
a compute device that supports a point-of-delivery (POD) in which a first microservice runs; and
a collector device that is in communication with the compute device;
wherein the compute device that includes one or more processors and memory, wherein the one or more processors are configured to perform operations including:
injecting a first trace agent within a side-car container of the first microservice;
when an application programming interface (API) request is made from the first microservice to a second microservice, adding, by the first trace agent, traceability metadata in a header within application data of the API request and within an application-layer protocol header of the API request;
generating or updating a first mapping table at the first trace agent for API request and API reply exchanges between the first microservice and the second microservice, the first mapping table including one or more entries generated by the first trace agent on the first microservice based on the traceability metadata;
generating or updating a second mapping table at a second trace agent on the second microservice, the second mapping table having one or more entries generated by a second trace agent on the second microservice based on the traceability metadata; and
exporting the first mapping table and the second mapping table to the collector device;
wherein the collector device is configured to reconcile and end-to-end API call flow between the first microservice and the second microservice using the first mapping table and the second mapping table.

19. The system of claim 18, wherein the collector device is configured to generate a call flow graph from the first mapping table and the second mapping table, wherein the call flow graph provides a visual representation of the end-to-end API call flow.

20. The system of claim 19, wherein the first mapping table and the second mapping table include information for an application identifier, source POD identifier, source microservice identifier, destination POD identifier, destination microservice identifier, trace identifier, and timestamp.

21. The system of claim 18, further comprising a next-hop API gateway, wherein the one or more processors of the compute device are configured to cause the first trace agent to forward the API request at the first microservice to a next-hop API gateway.

22. The system of claim 21, wherein the next-hop API gateway is configured to transparently forward the API request, invoke a webhook event and export the traceability metadata to the collector device before the API request can be dropped, or drop the API request and log the traceability metadata for export to the collector device.

* * * * *